May 29, 1956

L. YORK 2,747,372

MULTIPLE MASTER CYLINDER FOR THE HYDRAULIC
FEED SYSTEM OF A MOTOR VEHICLE

Filed June 8, 1953

To Wheel Brake Cylinders

INVENTOR.
LAWRENCE YORK
BY Herman L. Gordon
ATTORNEY

United States Patent Office 2,747,372
Patented May 29, 1956

2,747,372

MULTIPLE MASTER CYLINDER FOR THE HYDRAULIC FEED SYSTEM OF A MOTOR VEHICLE

Lawrence York, Pearl River, N. Y.

Application June 8, 1953, Serial No. 360,189

5 Claims. (Cl. 60—54.6)

This invention relates to hydraulic brake systems for motor vehicles, and more particularly to an improved multiple master cylinder for the hydraulic feed system of the wheel brake cylinders of a motor vehicle.

A main object of the invention is to provide a novel and improved multiple master cylinder for a motor vehicle hydraulic brake system wherein the wheel brake cylinders are supplied with brake fluid in a manner insuring equalization of fluid pressure to the respective brake shoe operating mechanisms, the improved master cylinder being simple in construction, being compact in size, and having means for independently adjusting the fluid pressures applied to the respective brake cylinders.

A further object of the invention is to provide an improved master cylinder of the type having respective individual cylinder elements and fluid pistons for the respective wheel brake cylinders of a vehicle, the fluid pistons being operated simultaneously responsive to the actuation of the brake pedal of the vehicle and the respective pistons being individually adjustable relative to each other, whereby the fluid pressures applied to the respective wheel brake cylinders may be adjusted to compensate for looseness or wear of the brake shoes or other mechanical components of the brake mechanisms, making mechanical adjustment of the said components unnecessary.

A still further object of the invention is to provide an improved multiple master cylinder for a motor vehicle hydraulic brake system, said master cylinder being inexpensive to manufacture, being rugged in construction, and being provided with means for rapidly and accurately adjusting the relative positions of the respective piston elements thereof from the outside of the master cylinder, whereby suitable compensation may be made for wear or looseness of the mechanical components of the respective wheel brake operating mechanisms, making mechanical adjustments of said mechanisms unnecessary, the improved master cylinder being further arranged so that a rupture or leak in the brake line connected to one of the wheel brake mechanisms will not prevent effective operation of the brake mechanisms associated with remaining wheels of the vehicle.

A still further object of the invention is to provide an improved multiple master cylinder which may be readily installed in a motor vehicle in place of the existing master cylinder thereof, to provide the advantages above set forth and to greatly increase the safety of operation of the vehicle by reducing the hazards of accidents otherwise likely to occur when one or more of the brake lines or brake cylinders of the vehicle becomes ruptured or leaky.

Further objects and advantages of the invention will become apparent from the following description and claims, and from the accompanying drawings, wherein:

Figures 1, 2, 3:
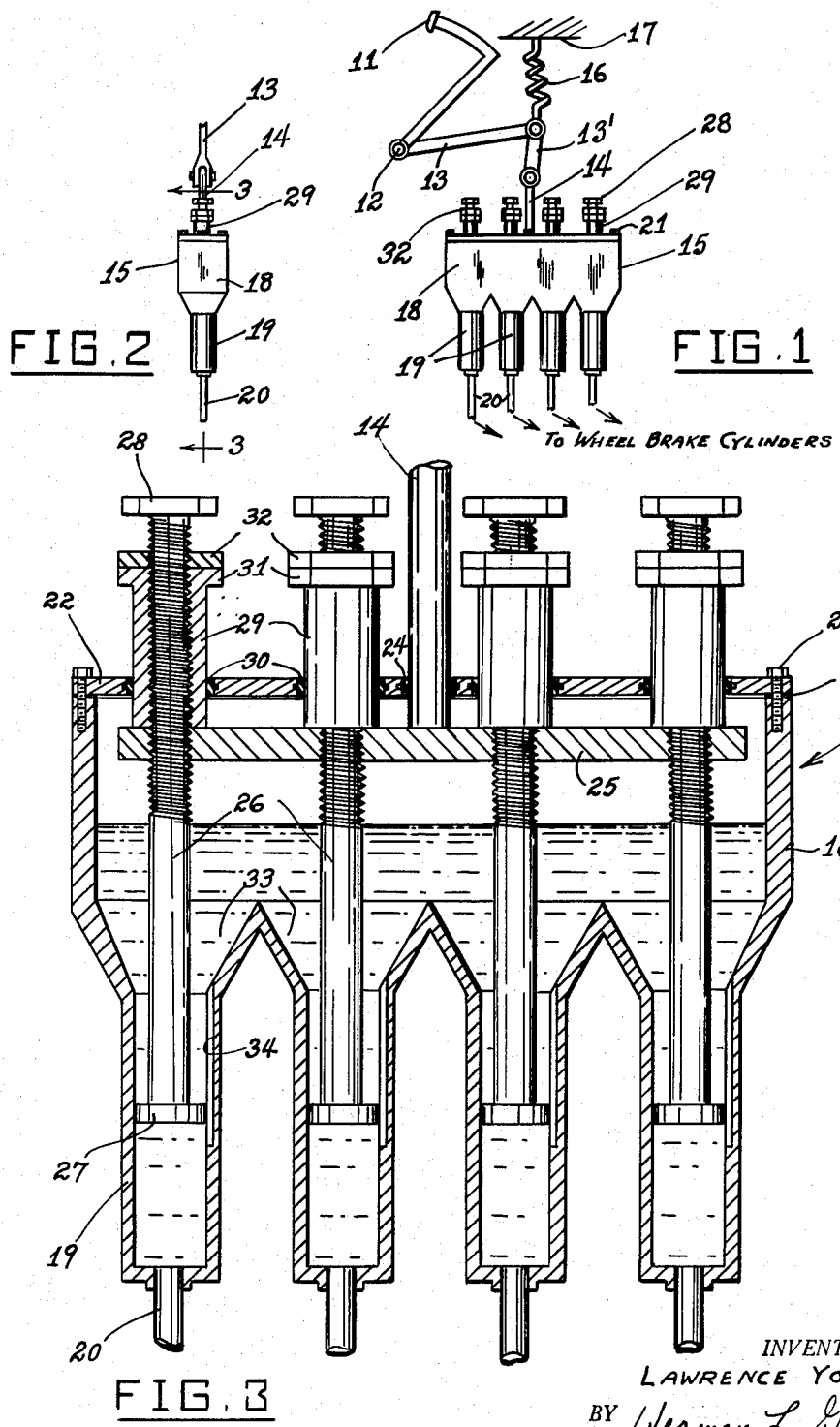
Figure 1 is a diagrammatic view showing how an improved multiple master cylinder according to the present invention is connected to the brake pedal of a motor vehicle, the multiple master cylinder being shown in side elevational view.
Figure 2 is an end elevational view of the multiple master cylinder shown in Figure 1.
Figure 3 is an enlarged vertical cross-sectional view taken through the multiple master cylinder on the line 3—3 of Figure 2.

Referring to the drawings, 11 designates the brake pedal of a motor vehicle, said pedal being connected to a shaft 12, having the usual arm 13 connected by a link 13' to the plunger rod 14 of the master cylinder, said master cylinder being designated generally at 15. The plunger rod 14 is biased upwardly by a coiled spring 16 connected between the arm 13 and the vehicle frame, shown at 17.

The master cylinder 15 comprises a vertically positioned housing 18 formed at its lower end with the four vertical cylinders 19, the bottom end of each cylinder being connected by a conduit 20 to one of the respective wheel brake cylinders of the vehicle, whereby the brake-operating mechanism of each wheel is individually controlled by a respective one of the cylinders 19.

Secured on the top rim of the housing 18 by fastening bolts 21 is the horizontal top cover plate 22, a gasket 23 of suitable deformable resilient material being provided between said cover plate and said top rim. The plunger rod 14 extends vertically through said cover plate and is vertically slidable through an annular sealing bushing 24 provided in the aperture of the cover plate through which rod 14 extends, as shown in Figure 3. The bushing 24 is preferably of resilient deformable material, such as neoprene, rubber, or the like, and is secured in any suitable manner in said aperture.

Rigidly secured to the lower end of the plunger rod 14 is the horizontal plate member 25, said plate member extending over the cylinders 19, as shown. Threadedly engaged through the plate member 25 in axial alignment with the respective cylinders are the respective vertical piston rods 26, each piston rod being provided at its lower end with a piston 27 slidably engaged in one of the cylinders 19.

The threaded top portions of the piston rods 26 extend upwardly through the cover plate 22 to a substantial height above said cover plate and are furnished on their top ends with the non-circular heads 28. Said heads may be hexagonal, for example, so as to be readily engaged by a wrench. Threadedly engaged on each piston rod 26 is a locking sleeve 29 which extends slidably, rotatably and sealingly through an annular sealing bushing 30 provided in the cover plate aperture, as shown. The bushings 30 are preferably of resilient deformable material, similar to the bushing 24, and are secured in the cover plate in any suitable manner.

The locking sleeves 29 are formed at their top ends with non-circular heads 31, shaped for engagement by a wrench, such as the hexagonal heads illustrated. A lock nut 32 is provided on the piston rod above each locking sleeve 29.

In adjusting the pistons 27 to secure proper equalization of braking fluid pressure at the respective wheel brake cylinders, the lock nuts 32 are first loosened, allowing the locking sleeves 29 to be rotated so as to release the piston rods 26 relative to the plate member 25. Each piston rod 26 may be thus adjusted relative to the plate member 25 to establish the desired position of its piston 27 in its cylinder 19. The piston rods 26 are locked in adjusted positions by tightening their locking sleeves 29, and the adjustments are then locked further by tightening the lock nuts 32 on the locking sleeves. The desired compensation for looseness or wear of the mechanical components of each wheel brake operating mechanism may thus be obtained without requiring mechanical adjustments of said components.

As shown in Figure 3, each cylinder 19 is formed at its top portion with an upwardly flaring individual fluid reservoir 33 in which a quantity of fluid will be retained, independently of the other cylinders 19. The interior wall of each cylinder is formed with a vertical groove 34 allowing fluid to flow into the lower portion of the cylinder below piston 27 when the associated piston rod 26 is in its elevated position. When the brake pedal 11 is depressed to apply the vehicle brakes, the pistons 27 are simultaneously moved downwardly in their cylinders 19 past the ends of the grooves 34, whereby braking pressure is applied to the fluid in the lower portions of the cylinders.

If a rupture or leakage should occur in one of the cylinders at the wheel brake mechanisms, or in the brake lines 20, the brake fluid will drain from housing 18 and from the reservoir 33 associated with the brake line having the leak or rupture, but a sufficient quantity of brake fluid will be retained in the other reservoirs 33 of the housing to insure proper operation of the brakes associated with the undamaged lines. Since the reservoirs 33 are preferably of substantial volume, this provides a definite safety factor allowing the vehicle to be operated with safety until the faulty line or cylinder can be repaired.

While the structure above specifically described and illustrated is arranged so that each wheel brake is controlled by an individual cylinder 19, if so desired, the housing 18 may be made with two cylinders 19 instead of four, and the respective cylinders 19 may be connected so that one cylinder 19 controls the front wheel brakes and the other cylinder 19 controls the rear wheel brakes. Thus, the front wheel brake lines may be connected together, and the junction thereof may be connected to one of the cylinders 19, and the rear wheel brake lines may be similarly joined and connected to the other cylinder 19.

While a specific embodiment of an improved multiple master cylinder for motor vehicles has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a motor vehicle having hydraulic wheel brake cylinders, a master cylinder comprising a housing formed with cylinders connected to the respective wheel brake cylinders, respective pistons in said second-named cylinders, said pistons having piston rod portions, a common actuating member connected to said piston rod portions inside said housing, said piston rod portions extending through a wall of said housing, and means to individually adjust said piston rod portions relative to said common actuating member from outside the housing.

2. In a motor vehicle having hydraulic wheel brake cylinders, a master cylinder comprising a housing formed with cylinders connected to the respective wheel brake cylinders, respective pistons in said second-named cylinders, said pistons having piston rod portions, a common actuating member threadedly engaged with said piston rod portions inside said housing, said piston rod portions extending through a wall of said housing and being individually rotatable relative to said common actuating member from outside the housing, and a locking sleeve threadedly engaged on each of said piston rod portions and extending rotatably and slidably through said wall and being formed to lockingly engage said actuating member, whereby the pistons may be locked in adjusted positions relative to said actuating member from outside the housing.

3. In a motor vehicle having hydraulic wheel brake cylinders, a master cylinder comprising a housing formed with vertical cylinders connected to the respective wheel brake cylinders, respective pistons in said vertical cylinders, said pistons having piston rod portions, a horizontal plate member disposed in said housing above said vertical cylinders, said piston rod portions being threadedly engaged through said plate member and extending through the top wall of said housing, a vertical plunger rod rigidly connected to said plate member and extending through said top wall, and a locking sleeve threadedly engaged on each of said piston rod portions above said plate member, the locking sleeves extending rotatably and slidably through said top wall and being formed and arranged to lockingly engage said horizontal plate member, whereby the pistons may be adjusted relative to said plate member, and whereby said pistons may be locked in adjusted positions, from outside of said housing.

4. In a motor vehicle having hydraulic wheel brake cylinders, a master cylinder comprising a housing formed with vertical cylinders connected to the respective wheel brake cylinders, respective pistons in said vertical cylinders, said pistons having piston rod portions, a horizontal plate member disposed in said housing above said vertical cylinders, said piston rod portions being threadedly engaged through said plate member and extending through the top wall of said housing, a vertical plunger rod rigidly connected to said plate member and extending through said top wall, and a locking sleeve threadedly engaged on each of said piston rod portions above said plate member, the locking sleeves extending rotatably and slidably through said top wall and being formed and arranged to lockingly engage said horizontal plate member, whereby the pistons may be adjusted relative to said plate member, and whereby said pistons may be locked in adjusted positions, from outside of said housing, said vertical cylinders being formed at their top portions with enlarged fluid reservoirs communicating with said vertical cylinders and defining emergency containers for hydraulic fluid for the vertical cylinders independent of each other.

5. In a motor vehicle having hydraulic wheel brake cylinders, a master cylinder comprising a housing formed with cylinders connected to the respective wheel brake cylinders, respective pistons in said second-named cylinders, said pistons having piston rod portions, a common actuating member having a portion thereof inside said housing, said inside portion being threadedly engaged by said piston rod portions, said piston rod portions extending through a wall of said housing, and means to individually rotate said piston rod portions relative to said common actuating member from outside the housing.

References Cited in the file of this patent

UNITED STATES PATENTS

| | | |
|---|---|---|
| 2,021,463 | Peters | Nov. 19, 1935 |
| 2,160,074 | La Brie | May 30, 1939 |
| 2,247,827 | Wegmann | July 1, 1941 |
| 2,375,415 | Hollowell et al. | May 8, 1945 |